US007538924B2

(12) United States Patent
Tomita

(10) Patent No.: US 7,538,924 B2
(45) Date of Patent: May 26, 2009

(54) OPTICAL SCANNER AND IMAGE FORMING APPARATUS INCLUDING A LIGHT SHIELDING DEVICE DISPOSED BETWEEN LIGHT BEAMS THAT FALL ON THE DEFLECTING UNIT AND LIGHT BEAMS THAT ARE DEFLECTED FROM THE DEFLECTING UNIT

(75) Inventor: Yasumasa Tomita, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 45 days.

(21) Appl. No.: 11/302,248

(22) Filed: Dec. 14, 2005

(65) Prior Publication Data

US 2006/0139440 A1 Jun. 29, 2006

(30) Foreign Application Priority Data

Dec. 15, 2004 (JP) ............................ 2004-363456
Oct. 21, 2005 (JP) ............................ 2005-307599

(51) Int. Cl.
*G02B 26/08* (2006.01)

(52) U.S. Cl. ...................................................... 359/204

(58) Field of Classification Search ................. 359/204, 359/205, 346

See application file for complete search history.

(56) References Cited

U.S. PATENT DOCUMENTS 5,166,704 A * 11/1992 Yasuda ....................... 347/248
6,110,595 A * 8/2000 Suzuki et al. .......... 430/270.11
2001/0019353 A1* 9/2001 Shiraishi et al. ............. 347/243
2004/0090658 A1* 5/2004 Takakubo ................... 359/205
2004/0169905 A1* 9/2004 Hayashi et al. ............. 359/204
2004/0233493 A1* 11/2004 Hayashi et al. ............. 359/205
2004/0263933 A1* 12/2004 Nakahata .................... 359/196

FOREIGN PATENT DOCUMENTS

JP 10-148781 6/1998
JP 2002-196269 7/2002
JP 2003-202515 7/2003
JP 2004-109722 4/2004

* cited by examiner

*Primary Examiner*—Stephone B. Allen
*Assistant Examiner*—Jennifer L. Doak
(74) *Attorney, Agent, or Firm*—Oblon, Spivak, McClelland, Maier & Neustadt, P.C.

(57) ABSTRACT

An optical scanner includes more than two light sources, a rotatable deflecting unit that commonly deflects the light beams emitted by the light sources. An optical unit guides a corresponding one of deflected light beams to a corresponding surface to be scanned. The optical system units are disposed symmetrically around a center of rotation of the deflecting unit. A housing unit that houses the light source units, the deflecting unit, and the optical system units. A light shielding unit disposed in the housing unit so as to prevent the reflection and scattering of the deflected light beams by the optical system units, the light shielding unit being disposed between light beams that fall on the deflecting unit and light beams that are deflected from the deflecting unit.

13 Claims, 10 Drawing Sheets

OPTICAL SCANNER AND IMAGE FORMING APPARATUS INCLUDING A LIGHT SHIELDING DEVICE DISPOSED BETWEEN LIGHT BEAMS THAT FALL ON THE DEFLECTING UNIT AND LIGHT BEAMS THAT ARE DEFLECTED FROM THE DEFLECTING UNIT

CROSS-REFERENCE TO RELATED APPLICATIONS

The present document incorporates by reference the entire contents of Japanese priority document, 2004-363456 filed in Japan on Dec. 15, 2004 and 2005-307599 filed in Japan on Oct. 21, 2005.

BACKGROUND OF THE INVENTION

1. Field of the Invention

The present invention relates to an optical scanner and an image forming apparatus that includes the optical scanner, and more particularly, to an optical scanner that optically scans a surface by using an optical deflecting unit.

2. Description of the Related Art

In a tandem color image forming apparatus, each optical beam of a plurality of light beams emerged from each of a plurality of light sources is irradiated on each of a plurality of image carriers to form a latent image on each image carrier. Each latent image is developed with a toner of different color, such as black, magenta, cyan, and yellow, to obtain a visible image of corresponding color. The visible images formed on the image carriers are transferred to a transfer material one above the other. As a result a multicolor image is formed on the transfer material.

Some tandem color image forming apparatuses employ a method of performing exposure scanning by each optical scanner provided for each image carrier. However, in this case, a polygon mirror is required in each optical scanner, and also a rotating deflector (optical deflector) is required. Moreover, a motor is required for driving the polygon mirror. As a result, such tandem color image forming apparatuses become costlier and bulky.

One approach is to use only one rotating deflector. Tandem color image forming apparatuses that use only one rotating deflector have been disclosed in Japanese Patent Application Laid-open Publication Nos. H10-148781, 2002-196269, and 2003-202515.

Problems involved in the conventional method are described with an example of an optical writing unit (hereinafter, "optical scanner") described in Japanese Patent Application Laid-open. Publication No. 2002-196269, with reference to FIG. 8 and FIG. 9. In both FIGS. 8 and 9, reference numeral 500 denotes a conventional optical scanner. In the optical scanner 500, with a single rotating deflector 62 at a center, light source units 52, 53, 54, and 55 which include a light source at substantially symmetrical positions with respect to the rotating deflector 62, and first lenses for image forming (hereinafter, "scanning lenses") 63 and 64 are disposed. The exposure scanning is performed by distributing light beams L1, L2, L3, and L4 from the light source units 52, 53, 54, and 55 respectively to left and right sides.

The two light beams each from among the light beams L1 to L4 from the four light source units 52 to 55 are distributed in two symmetrical directions by the rotating deflector 62 that rotates in a direction of an arrow in FIG. 8, and are subjected to deflection scanning. The light beams subjected to the deflection scanning are formed as images on surfaces to be scanned (not shown in the diagram) of the four image carriers via a scanning optical system that includes the scanning lenses 63 and 64, and mirrors 65, 66, 67, and 68 for reflecting an optical path. In FIG. 8, reference numeral 95 denotes a wall surface of light shielding members 89 and 90.

In the optical scanner 500, the rotating deflector 62 can be let to be a single rotating deflector, thereby enabling to reduce the cost and the size of the optical, scanner as compared to a size of an image forming apparatus that includes a plurality of optical scanners. However, in the optical scanner (so called opposite-side scanning scanner) having such structure, as shown in the diagram, with the rotating deflector 62 as a center, since each optical system is disposed symmetrically, flare light from the optical systems that are mutually opposite sometimes causes a problem. For example, when a light beam is reflected and scattered at a side of a surface of incidence of the scanning lens 63 and 64 that are mutually opposite sandwiching the rotating deflector 62, stray light becomes the flare light and advances in a reverse direction entering into an optical system on the opposite side. This stray light is irradiated on an image carrier that is not supposed to be subjected to the exposure scanning, and becomes a ghost image or an image with lines, thereby substantially deteriorating an image quality.

Japanese Patent Application Laid-open Publication Nos. H10-148781 and 2003-202515 propose a technology to solve the above problems.

For example, a technology disclosed in Japanese Patent Application Laid-open Publication No. 2003-202515 is related to an optical scanner that is capable of cutting the flare light effectively without deteriorating jitter (fluctuation) in a main scanning direction and noise of the polygon mirror and forming a high quality image by using simple components such as plastic lenses, and a color image forming apparatus that uses this optical scanner. In this technology, the flare light is prevented by providing a light shielding member in an effective area sandwiched between an optical path of a light beam that is incident on the rotating deflector and an optical path of a scanning beam that is reflected and deflected at the rotating deflector and incident on a surface to be scanned. By providing the light shielding member at such location, it is possible to dispose the light shielding member separated away from the rotating deflector and to reduce wind noise caused due to rotations of the rotating deflector.

A technology disclosed in Japanese Patent Application Laid-open Publication No. 2002-196269 is related to an optical writing unit and an image forming apparatus that is capable of preventing an entry of the flare light into an optical system on the opposite side, even when the flare light is generated by optical systems opposite to each other sandwiching the rotating deflector, in an optical writing unit that performs deflection scanning of a plurality of light beams by one rotating deflector by distributing the light beams in two symmetrical directions. This technology is characterized by providing the light shielding members 89 and 90 as shown in FIG. 8 in an area other than an area that is subjected to deflection scanning, by a single rotating deflector.

Moreover, a technology disclosed in Japanese Patent Application Laid-open Publication No. H10-148781, is related to a light beam scanner that is capable of preventing and reducing stray light that is reflected from one of two scanning and imaging optical systems that are disposed symmetrically with respect to a rotating polygon mirror with an optical axis of the optical systems substantially parallel to be incident on the other scanning and imaging optical system and becoming noise.

However, in the technology disclosed in the Japanese Patent Application Laid-open Publication No. 2003-202515, for preventing the entire flare light, it is necessary to dispose the light shielding members very near to the rotating deflector and for shielding only the flare light without shielding the essential light beam, a very high component accuracy is required, which results in a high cost of components.

In addition, with an arrangement of the light shielding member according to an embodiment of this technology, for shielding the entire flare light, since the shielding member has to be still disposed near the rotating deflector, the problem of the wind noise due to the rotation of the rotating deflector remains to be there.

Moreover, in this case, not only the wind noise but also a rise in temperature near the rotating deflector caused due to a windage loss that occurs due to the rotation of the rotating deflector is a problem. In other words, by providing the light shielding member near the rotating deflector, a pressure of an air flow is increased locally and as a result of this, there is a rise in the temperature caused due to the windage loss. Such rise in temperature near a portion where the rotating deflector is installed, deteriorates a stability of operation and life span of the rotating deflector, as well as deteriorates color superimposing accuracy (so called color shift) and an imaging efficiency of a scanning optical system due to a transmission and a propagation of heat to the scanning optical system, thereby deteriorating remarkably the image quality. In particular, this effect is extremely greater in a color image forming apparatus that includes this optical scanner.

Moreover, in the technology disclosed in the Japanese Patent Application Laid-open Publication No. 2002-196269, regarding the noise which is one of the problems mentioned, the technology is characterized by employing a structure in which a gap that allows the air flow to escape is provided in the light shielding member. However, since the light shielding member is disposed near the rotating deflector, the problems of noise and rise in temperature still have not been solved completely.

In addition, in a case of forming the light shielding member in this technology integrally in an optical housing that includes the rotating deflector, if a case in which a cheap resin molded product is used as the optical housing is assumed, a die structure becomes complicated (a portion corresponding to a light shielding wall of the light shielding member is under cut or forced cut) and may result in a rise in the cost.

SUMMARY OF THE INVENTION

It is an object of the present invention to at least solve the problems in the conventional technology.

According to an aspect of the present invention, an optical scanner includes a plurality of light source units, each light source unit emitting a light beam; a rotatable deflecting unit that commonly deflects the light beams emitted by all the light source units; and a plurality of optical units, each of which guides a corresponding one of deflected light beams to a corresponding surface to be scanned, the optical system units being disposed symmetrically around a center of rotation of the deflecting unit; a housing unit that houses the light source units, the deflecting unit, and the optical system units; and a light shielding unit disposed in the housing unit so as to prevent the reflection and scattering of the deflected light beams by the optical system units, the light shielding unit being disposed between light beams that fall on the deflecting unit and light beams that are deflected from the deflecting unit.

According to another aspect of the present invention, an a plurality of light source units, each light source unit emitting a light beam; a rotatable deflecting unit that commonly deflects the light beams emitted by all the light source units; and a plurality of optical units, each of which guides a corresponding one of deflected light beams to a corresponding surface to be scanned, the optical system units being disposed symmetrically around a center of rotation of the deflecting unit; a housing unit that houses the light source units, the deflecting unit, and the optical system units; and an accommodating chamber that houses the deflecting unit, the accommodating chamber being disposed inside the housing unit; and a light shielding unit disposed in the housing unit and outside the accommodating chamber so as to prevent the reflection and scattering of the deflected light beams by the optical system units.

According to still another aspect of the present invention, an image forming apparatus includes an optical scanner according to the above aspects; and a plurality of image carriers that includes a surface subjected to scanning.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
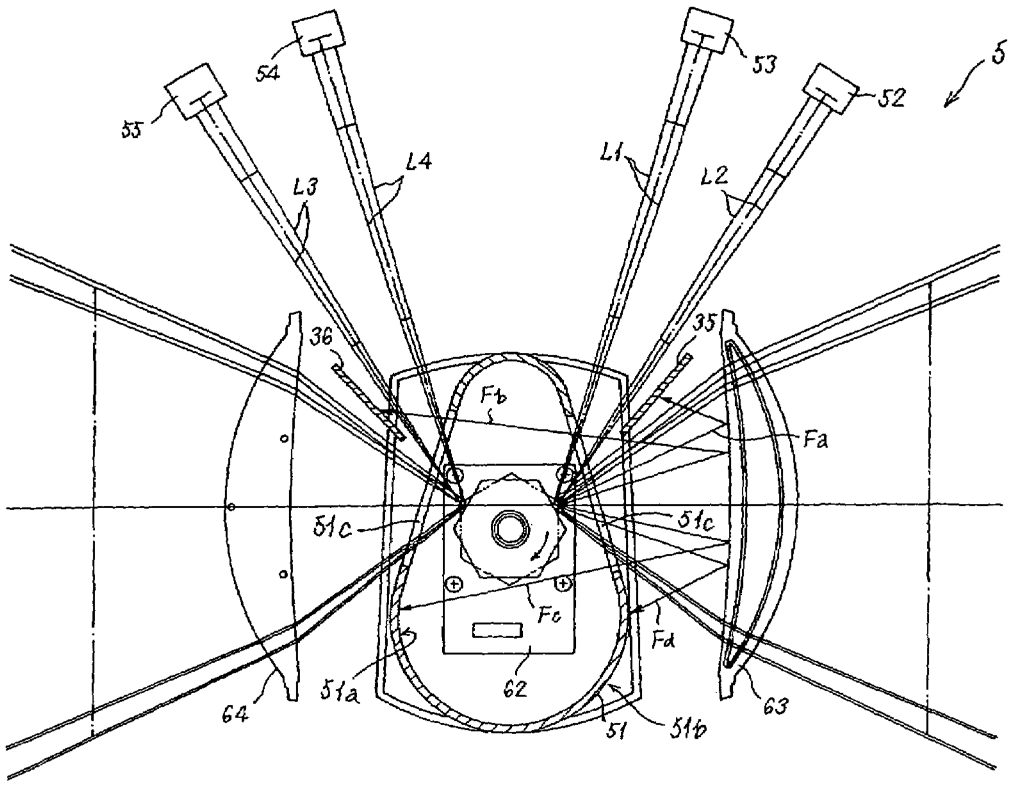
FIG. 1 is a plan view (top view) of main components of an optical scanner according to a first embodiment of the present invention.

Exemplary embodiments of the present invention are described below with reference to the accompanying diagrams. Same reference numerals are used for members and components which have the same function and shape as well as the disposing position in the examples of conventional technology mentioned above, in the embodiments, and modified embodiments, and the description of such members and components will be omitted to avoid repetition. To make the diagrams and description concise, components which are to be indicated in a diagram but for which it is not necessary in particular to describe in the diagram are omitted. While describing by referring to components in other Japanese Patent Publication, reference numeral of such components are put in brackets and distinguished from embodiments of the present invention.

A basic structure and operation of an image forming apparatus that includes an optical scanner to which the present invention is applied is described with reference to FIG. 8 and FIG. 9.

Figure 9:
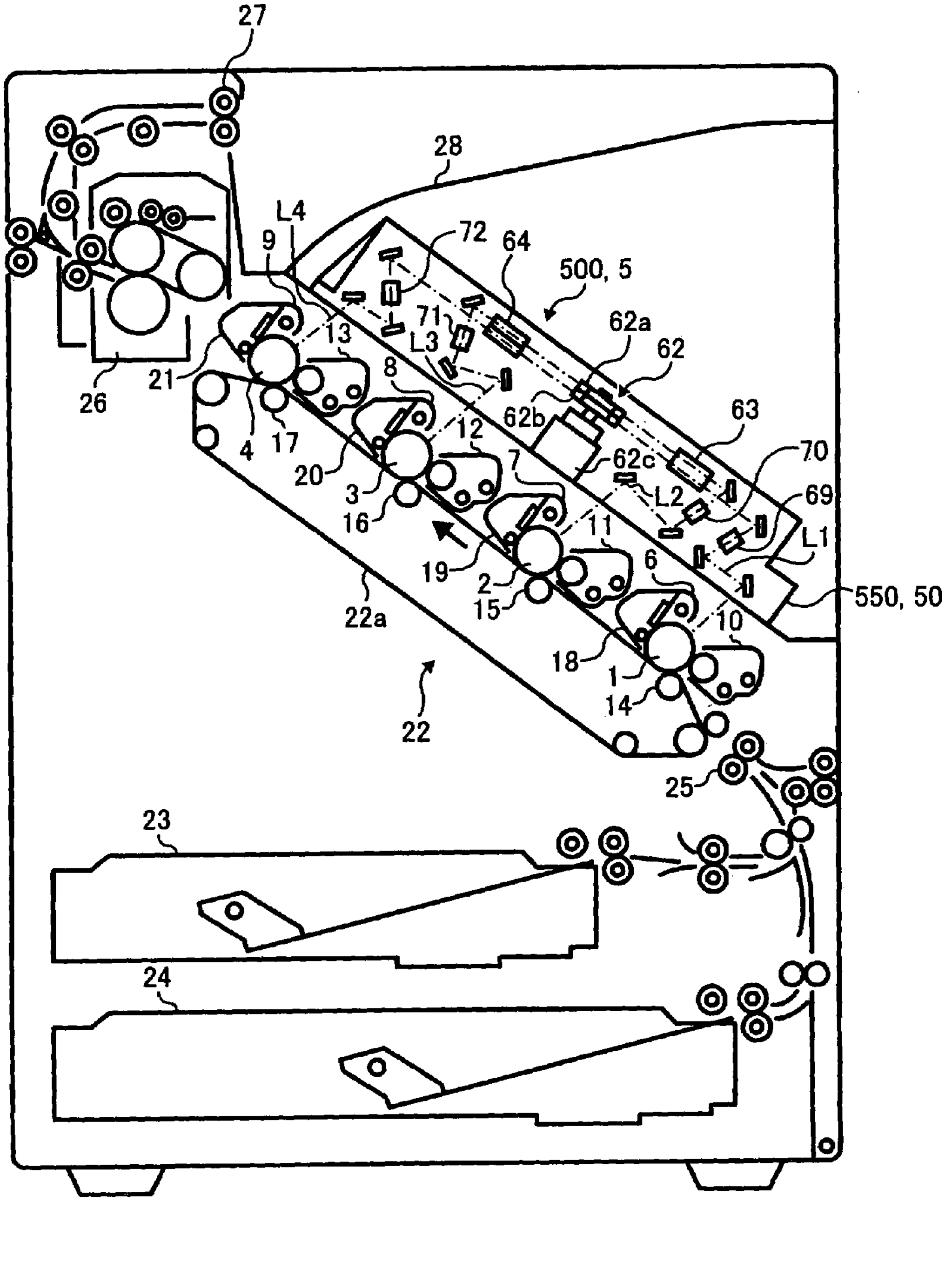
FIG. 9 PRIOR ART
FIG. 9 is a schematic front view of a conventional image forming apparatus that includes the optical scanner shown in FIG. 8.

The image forming apparatus shown in FIG. 9 is a full color image forming apparatus that includes photoconductive photosensitive drums (hereinafter, "photosensitive drums") 1, 2, 3, and 4 disposed in parallel as image carriers. Each photosensitive drums 1, 2, 3, and 4 form an image corresponding to four colors in an order of yellow (Y), magenta (M), cyan (C), and black (Bk) from right to left in the diagram. It is needless to mention here that the order of the colors is not restricted to Y, M, C, and Bk and can be set voluntarily.

Various units for performing an image formation by an electrophotography are disposed around the photosensitive drums 1, 2, 3, and 4. These units include an optical writing unit (hereinafter, "optical scanner") 500 which is used commonly for the photosensitive drums 1, 2, 3, and 4, charging units (such as charging roller, charging brush, charger) 6, 7, 8, and 9 which are means for charging, developing units (developer unit for each of Y, M, C, and Bk colors) 10, 11, 12, and 13 which are means for developing, a transferring and carrier unit 22 that includes a transfer and carrier belt 22*a* as a means for transferring and carrying which is stretched over each of rollers and transferring units (such transfer roller and transfer brush) 14, 15, 16, and 17 as means for transferring that are disposed on a rear side of the transfer and carrier belt 22*a*, and cleaning units (such as cleaning blade and cleaning brush) 18, 19, 20, and 21 as means for cleaning. With these units disposed around the photosensitive drums 1, 2, 3, and 4, it is possible to form an image of each color on each of the photosensitive drums 1, 2, 3, and 4.

The optical scanner 500 is an example of a normal opposite side scanning type of optical scanner.

The developing units 10, 11, 12, and 13 have a function and structure of the means for developing by developing a latent image formed on each of the photosensitive drums 1, 2, 3, and 4 by a developer of different color and visualizing the image developed. The transferring units 14, 15, 16, and 17 and the transferring and carrier unit 22 functions and is structured to carry a transfer material as a recording medium in the form of a sheet to a position of each of the photosensitive drums 1, 2, 3, and 4 and to superimpose and transfer on the transfer material visible images of each color formed on the photosensitive drums 1, 2, 3, and 4.

Figure 4:
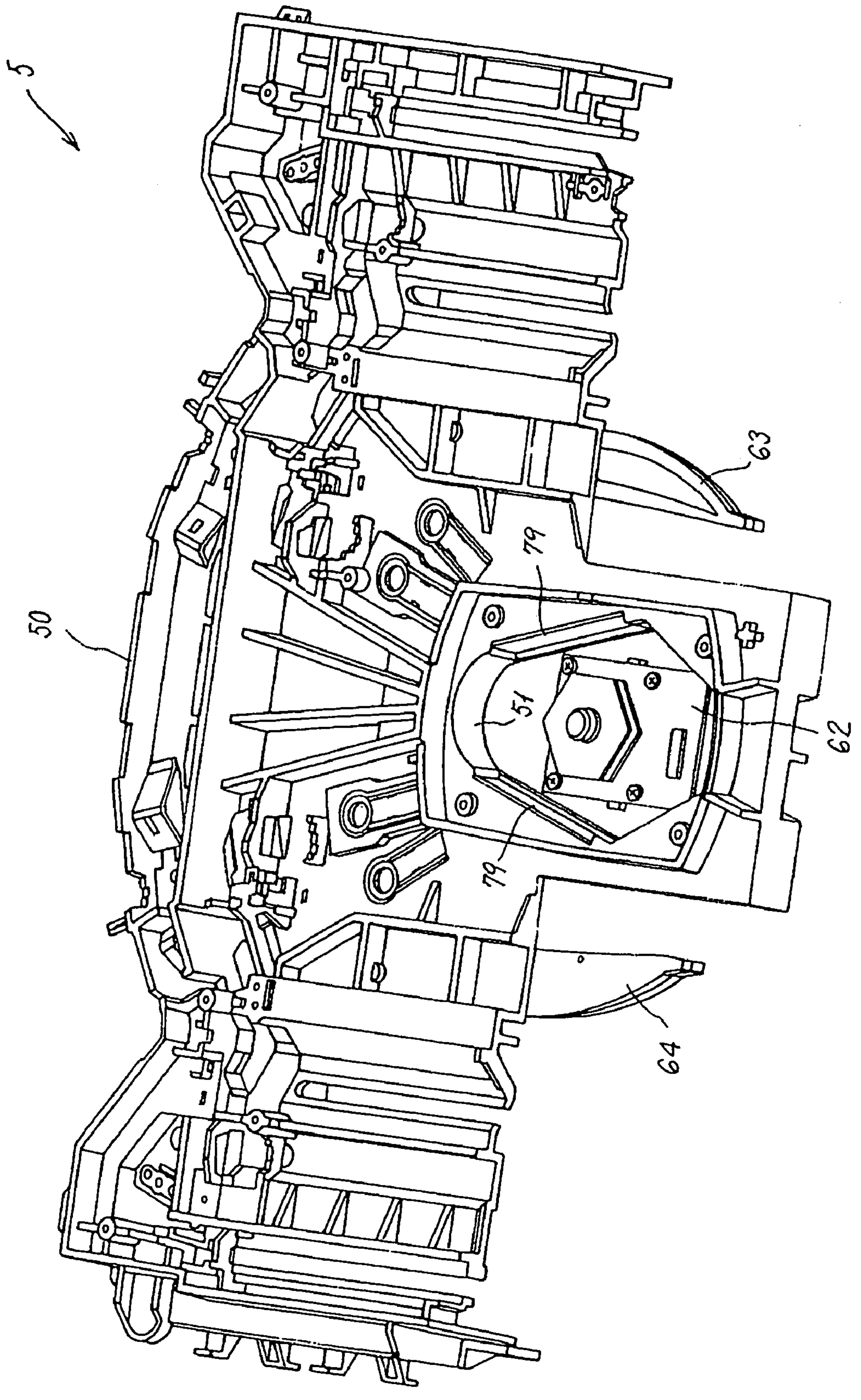
FIG. 4 is a plan view (top view) of an optical scanner according to a first modification of the first embodiment.
Figure 8:
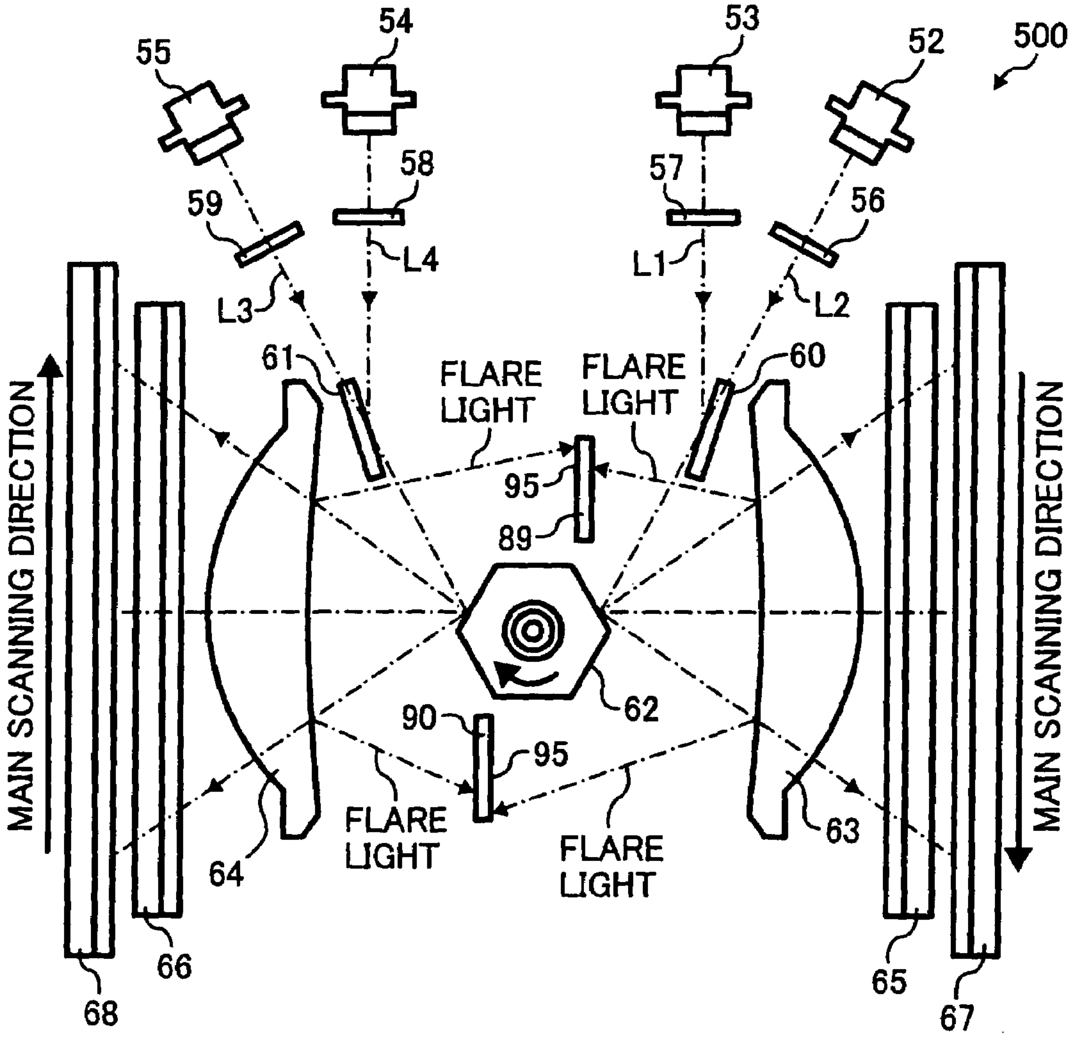
FIG. 8 PRIOR ART
FIG. 8 is a plan view (top view) of relevant portions of a conventional optical scanner.

The optical scanner 500 (corresponds to an optical scanner (5) shown in FIG. 1 and FIG. 4 of Japanese Patent Application Laid-open Publication No. 2002-196269), as shown in FIG. 8 and FIG. 9 includes four light source units 52, 53, 54, and 55 as a plurality of means for light source, a rotating deflector 62 as a means for deflecting that performs deflection scanning by distributing light beams L1, L2, L3, and L4 from the light source units 52, 53, 54, and 55 respectively in two symmetrical directions, and a scanning optical system (such as scanning lenses 63, 64, 69, 70, 71, and 72 shown in FIG. 8 and FIG. 9 and mirrors 65, 66, 67, and 68 for reflecting an optical path shown in FIG. 8) as an optical system means that is disposed symmetrically in the two directions with the rotating deflector 62 as a center and guides the plurality of light beams L1, L2, L3, and L4 that is subjected to deflection scanning by the rotating deflector 62, to surfaces subjected to scanning of the photosensitive drums 1, 2, 3, and 4. All these members of the optical scanner 500 are accommodated in a single optical housing 550. More concretely, the four light source units 52, 53, 54, and 55 are disposed on a side wall of the optical housing 550, the rotating deflector 62 is disposed at a substantially central portion of a base of the optical housing 550 (refer to a base (5) shown in FIG. 4 of the Japanese Patent Application Laid-open Publication No. 2002-196269), and the scanning optical system is disposed partially on a top surface side and partially on a bottom surface side of the base.

Apart from the mirrors 65, 66, 67, and 68 for reflecting an optical path shown in FIG. 8, the identical mirrors are disposed at predetermined positions. However, details of these mirrors being similar to mirrors shown in FIG. 4 of the Japanese Patent Application Laid-open Publication No. 2002-196269, the description of these mirrors are omitted. In FIG. 8, reference numerals 60 and 61 denote reflecting mirrors which function only for the light beams L1 and L4.

In FIG. 9, the reference numeral 5 in brackets denotes an optical scanner according to an embodiment of the present invention, and the reference numeral 50 in brackets denotes an optical housing denotes an optical scanner according to the embodiment.

In this optical scanner 500, image data with color separated that is input from an image data outputting unit (such as a receiving section of a facsimile, a personal computer, and a word processor) or a document reading unit (scanner) that is not shown in the diagram is converted into a signal for driving a light source, and according to this signal a light source (semiconductor laser (LD)) in each of the light source units 52, 53, 54, and 55 is driven, thereby irradiating the light beams L1, L2, L3, and L4. The light beams L1, L2, L3, and L4 irradiated from each of the light source units 52, 53, 54, and 55 reach the rotating deflector 62 via cylindrical lenses 56, 57, 58, and 59 for optical face tangle error correction and reflecting mirrors 60 and 61 (only for the light beams L1 and L2), and are subjected to the deflection scanning in two symmetrical directions at two-stage polygon mirrors 62*a* and 62*b* that are rotated at a same velocity by a polygon motor 62*c*.

The two light beams each from among the light beams L1, L2, L3, and L4 that are subjected to the deflection scanning in two directions at the polygon mirrors 62*a* and 62*b* of the rotating deflector 62 pass through scanning lenses 63 and 64 respectively that include an fθ lens having a vertical two-layered structure for example and are reflected by first reflecting mirrors 65, 66, 67, and 68 to pass through an aperture section of the base. After passing through the aperture section, the light beams pass through second lenses for image forming 69, 70, 71, and 72 that include a long toroidal lens and then via second reflecting mirrors (refer to second reflecting mirrors (73, 75, 77, and 79) shown in FIG. 4 of the Japanese Patent Application Laid-open Publication No. 2002-196269), third reflecting mirrors (refer to third reflecting mirrors (74, 76, 78, and 80) shown in FIG. 4 of the Japanese Patent Application Laid-open Publication No. 2002-196269), and a dust proof glass, the light beams are irradiated on the surface subjected to scanning of each of the photosensitive drums 1, 2, 3, and 4 for each color and an electrostatic latent image is written and formed.

In the optical scanner 500, each of the four light source units 52, 53, 54, and 55 includes a semiconductor laser (LD) that is a light source and a collimating lens that collimates an irradiated light beam of the semiconductor laser combined integrally. A mirror for synchronism detection that is not shown in the diagram for fetching light beams at a scanning-start position in a main scanning direction is provided in an optical path of each of the light beams L1, L2, L3, and L4.

Light beam reflected at the mirror for synchronism detection is received at synchronism detectors (81 and 82) similar to the synchronism detectors described in a paragraph [0025] of the Japanese Patent Application Laid-open Publication No. 2002-196269, and a synchronization signal of scanning-start is output. Moreover, stepping motors (92, 93, and 94) for a skew adjustment similar are provided to the third reflecting mirrors disposed in the optical paths of the light beams L1, L2, and L3 and with a scanning line position of the light beam L4 as a base, a shift in scanning line positions of the light beams L1, L2, and L3 is corrected.

A scanning direction of the light beams L1, L2, L3, and L4 that are subjected to the deflection scanning by the rotating deflector 62 is a main scanning direction as well as an axial direction of each of the photosensitive drums 1, 2, 3, and 4. A direction orthogonal to the main scanning direction is a secondary scanning direction and the secondary scanning direction is a direction of rotation of the photosensitive drums 1, 2, 3, and 4 (a direction of movement of a surface of the photosensitive drum) as well as a direction of carrying by the transfer and carrier belt 22*a*. In other words, a secondary direction of the transfer and carrier belt 22*a* is the main scanning direction and the direction of carrying is the secondary scanning direction.

As shown in FIG. 9, the transfer and carrier belt 22*a* that is stretched over a driving roller and a plurality of driven rollers is disposed under the four photosensitive drums 1, 2, 3, and 4 that are arranged in parallel and the transfer and carrier belt 22*a* carries in a direction shown by an arrow in the diagram by the driving roller. A plurality of paper feeding sections 23 and 24 that store transfer material such as a recording paper is disposed on a lower part of a main body of the image forming apparatus. The transfer material stored in the paper feeding sections 23 and 24 is fed to the transfer and carrier belt 22*a* via a paper feeding roller, a carrier roller, and a pair of registering rollers 25, and is further held and carried by the transfer and carrier belt 22*a*.

Each latent image formed on each of the photosensitive drums 1, 2, 3, and 4 by the optical scanner 500 is developed by a toner of each of Y, M, C, and Bk colors in each developing unit to form a visualized image. Visualized toner images of each of the Y, M, C, and Bk colors are superimposed and transferred one after another to a transfer material that is held on the transfer and carrier belt 22*a*, by the transferring units 14, 15, 16, and 17. The transfer material with a four color image transferred thereon is carried to a fixing unit 26 that is a means for fixing. After fixing the image in the fixing unit 26, the image is discharged to a paper discharge tray 28 by a paper discharge roller 27.

However, in a case of a structure in which the scanning lenses 63 and 64 and the mirrors 65 to 68 for reflecting an optical path that form the optical system are disposed symmetrically with the rotating deflector 62 as a center as shown in FIG. 8, and the four light beams L1, L2, L3, and L4 are subjected to the deflection scanning by distributing the two beams each in the two symmetrical directions by a single rotating deflector 62, flare light from optical systems mutually opposite to each other causes a problem. For example, when the light beam is reflected and scattered at a side of a surface of incidence of the scanning lenses 63 and 64 that are opposite to each other sandwiching the rotating deflector 62, the reflected and scattered light (flare light) advances in a reverse direction and enters into the optical system on the opposite side. The flare light entered into the optical system on the opposite side is irradiated on each of the image carriers (photosensitive drums 1, 2, 3, and 4) via the optical system. When the flare light is irradiated on the image carrier, a ghost image or a blur in the form of lines corresponding to the flare light occurs on the image and causes deterioration of the image quality.

Figure 2:
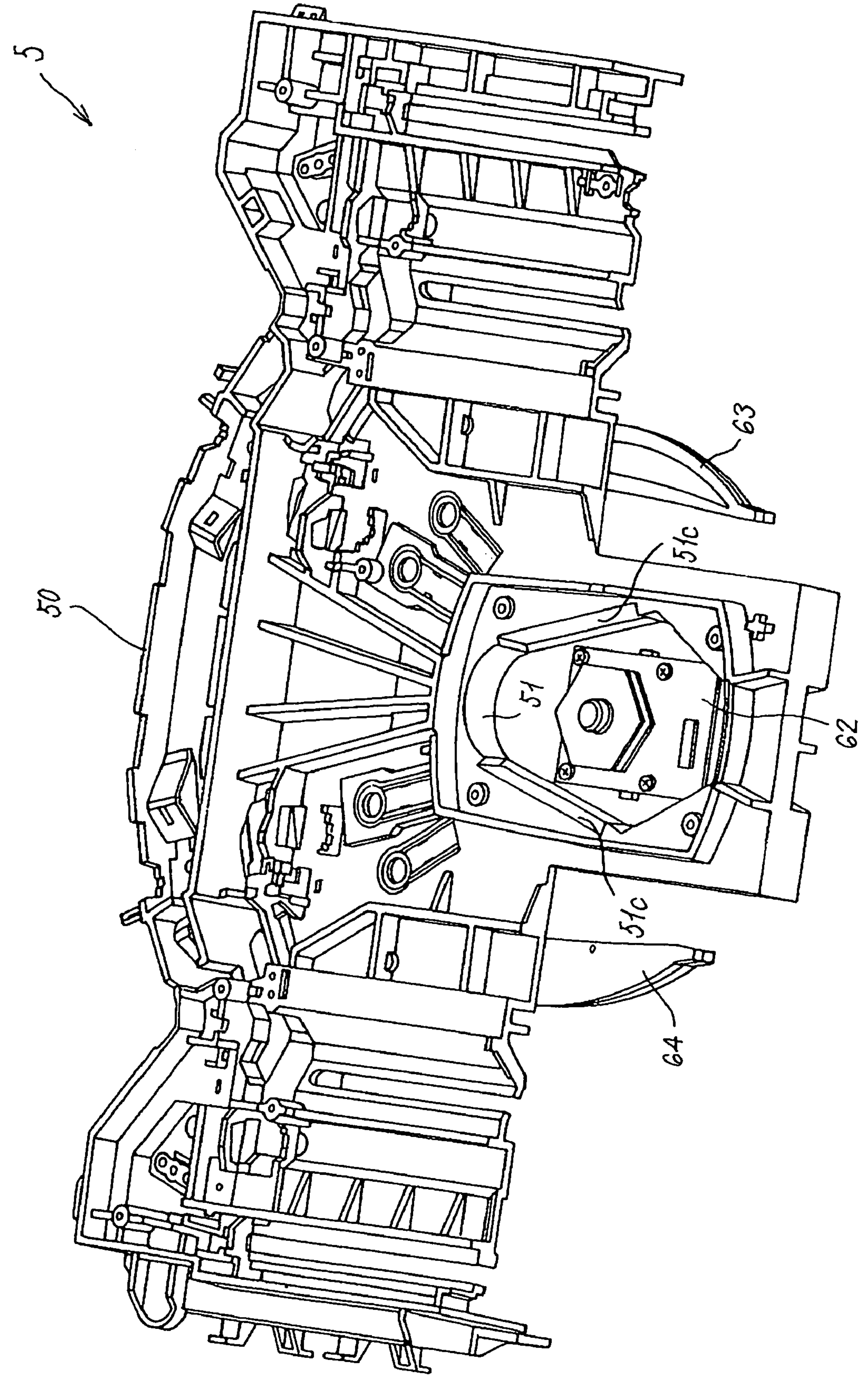
FIG. 2 is a perspective view of an upper side of the optical scanner in FIG. 1.
Figure 3:
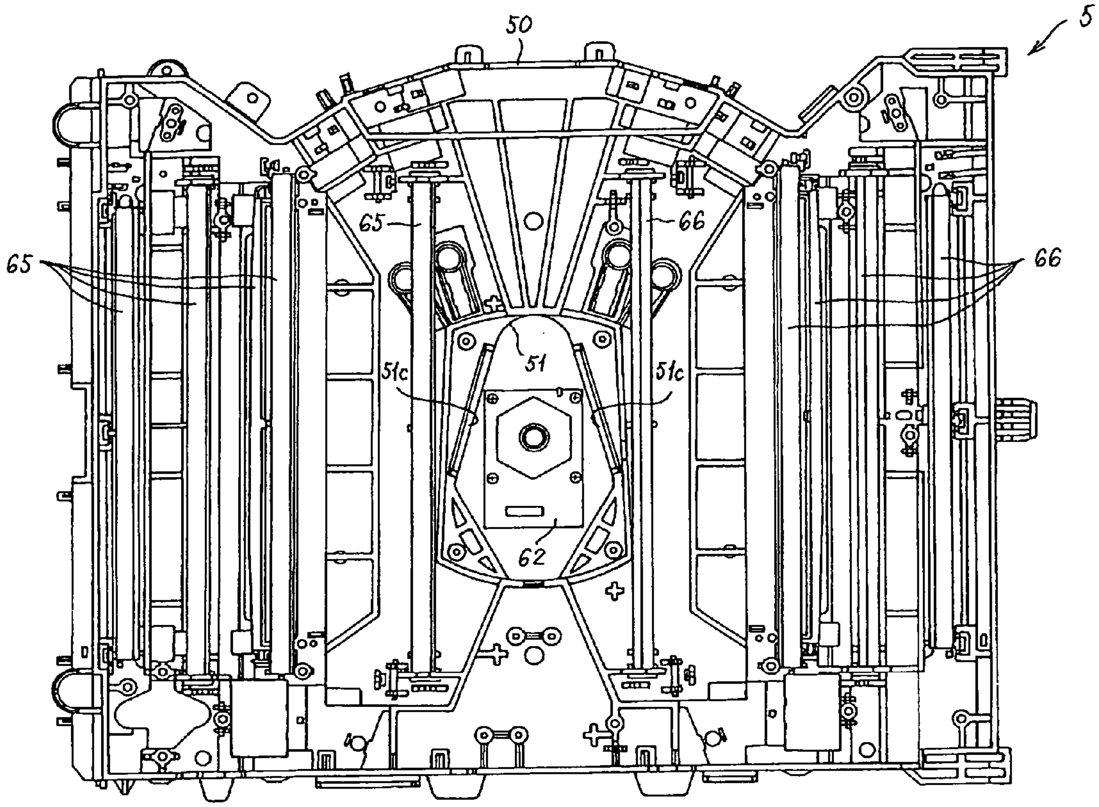
FIG. 3 is a plan view (top view) of the optical scanner shown in FIG. 1.

In view of this problem, the optical scanner 5 according to an embodiment of the present invention and an image forming apparatus that included the optical scanner 5 as shown in FIG. 1 to FIG. 3, are invented. The embodiment shown in FIG. 1 to FIG. 3 differs only at points that the optical scanner 5 that is shown to be distinguished by enclosing in brackets in both the diagrams is used instead of the optical scanner 500 shown in FIG. 8 and FIG. 9, and an image forming apparatus that includes the optical scanner 5 that is shown to be distinguished by enclosing in brackets in the same diagram is used.

The optical scanner 5 as compared to the optical scanner 500 differs at a point that instead of the optical housing 550, the optical scanner 5 includes an optical housing 50 as a housing means that is shown to be distinguished by enclosing in brackets in FIG. 9 and shown in FIG. 1 to FIG. 3, and a point that a pair of light shielding members 35 and 36 as a light shielding means that prevents the reflection and scattering of light beams subjected to the deflection scanning by the rotating deflector 62, by the scanning optical system on the mutually opposite side, is disposed on an outer side of an accommodating chamber 51 that is formed integrally in the optical housing 50. The rest of the structure of the optical scanner 50 is substantially similar to the structure of the optical scanner 500.

The optical scanner 5 has a functioning and structure as a means for optical scanning that is also called as means for optical writing for forming by writing a latent images by irradiating the light beams L1, L2, L3, and L4 on the surface subjected to scanning of the photosensitive drums 1, 2, 3, and 4.

In other words, the optical scanner includes the four light source units 52, 53, 54, and 55 as a plurality of means for light source, the single rotating deflector 62 as a means for deflecting that performs the deflection scanning by distributing the light beams L1, L2, L3, and L4 from the light source units 52, 53, 54, and 55 respectively into two symmetrical directions, and a scanning optical system (the scanning lenses 63 and 64 shown in FIG. 1 and the mirrors 65, 66 for reflecting an optical path shown in FIG. 3) as an optical system means that guides the light beams L1, L2, L3, and L4 scanned by the rotating deflector 62 to the surfaces subjected to scanning of the photosensitive drums 1, 2, 3, and 4 corresponding to the light beams L1, L2, L3, and L4 and forms an image on each of the surfaces. Each scanning optical system is disposed axisymmetric with respect to a central line in a vertical direction of the rotating deflector 62 and the light source units 52, 53, 54, and 55, the rotating deflector 62, and each of the scanning optical systems are disposed in the optical housing 50 as a single housing means. The rotating deflector 62 is disposed on an inner side of the accommodating chamber 51 shown by hatching in FIG. 1 that is formed by the optical housing 50. The pair of light shielding members 35 and 36 as a light shielding means that prevents the reflection and scattering of the light beams subjected to the deflection scanning by the rotating deflector 62 is provided in the optical housing 50.

The light shielding members 35 and 36 are disposed between the light beams L2 and L3 that are incident on the rotating deflector 62 from the light source units 52 and 55 respectively and a light beam that is subjected to the deflection scanning to the scanning optical system from the rotating deflector 62. By disposing the light shielding members 35 and 36 in such manner, with the light shielding members placed further away from the rotating deflector 62, an effect similar to the effect achieved in the conventional technology described with reference to FIG. 8 can be achieved. Therefore, the wind noise caused by the rotations of the rotating deflector 62 can be reduced and an increase in the wind noise due to the light shielding members 35 and 36 (light shielding-means) can be prevented.

The optical housing 50 is formed integrally with the light shielding members 35 and 36, and the accommodating chamber 51, of a resin such as a polycarbonate resin (PC). In the polycarbonate resin, carbon black is mixed as pigments to absorb the light reflected and scattered (hereinafter, "flare light") by the scanning optical system. The four light source units 52, 53, 54, and 55 are installed on a side wall of the optical housing 50.

Each of the light shielding members 35 and 36 is disposed at a position substantially symmetrical with respect to a central line in a vertical direction of the rotating deflector 62 such that the light shielding member is sandwiched between the scanning lenses 63 and 64. In this embodiment, each of the light shielding members 35 and 36 is formed integrally with the accommodating chamber 51 and the optical housing 50. Moreover, an aperture 51*c* through which the light beam passes is provided in a part of the accommodating chamber 51 of the optical housing 50.

An inner wall 51*a* and an outer wall 51*b* of the accommodating chamber 51 serves as the light shielding member that prevents light reflected and scattered by each scanning optical system on a side where the light source units 52, 53, 54, and 55 are not there, with respect to a center of an optical axis of each scanning optical system.

If effects described earlier and advantages that are described later are not expected to be achieved to that extent, instead of forming the light shielding members 35 and 36 integrally with the accommodating chamber 51 and the optical housing 50, the light shielding members 35 and 36 may be formed by a separate member that prevents the reflecting and scattering of light and may be fixed by a fixing means such as a screw or by an adhesive or a double-stick tape. Moreover, a surface treatment and a material and shape of the light shielding members 35 and 36 is not restricted to one that allows to absorb the flare light and may be the one that reduces the flare light to an acceptable extent.

However, normally, since the rotating deflector 62 rotates at a very high velocity, the noise due to the wind noise caused by the rotation causes a problem. Even in the first embodiment, similar to the light shielding member (89 and 90) of the conventional technology shown in FIG. 8, the light shielding members 35 and 36 for preventing the flare light are provided as described above. However, the light shielding members 35 and 36 are disposed at positions on an outer side of the accommodating chamber 51 that accommodates the rotating deflector 62.

Figure 6:
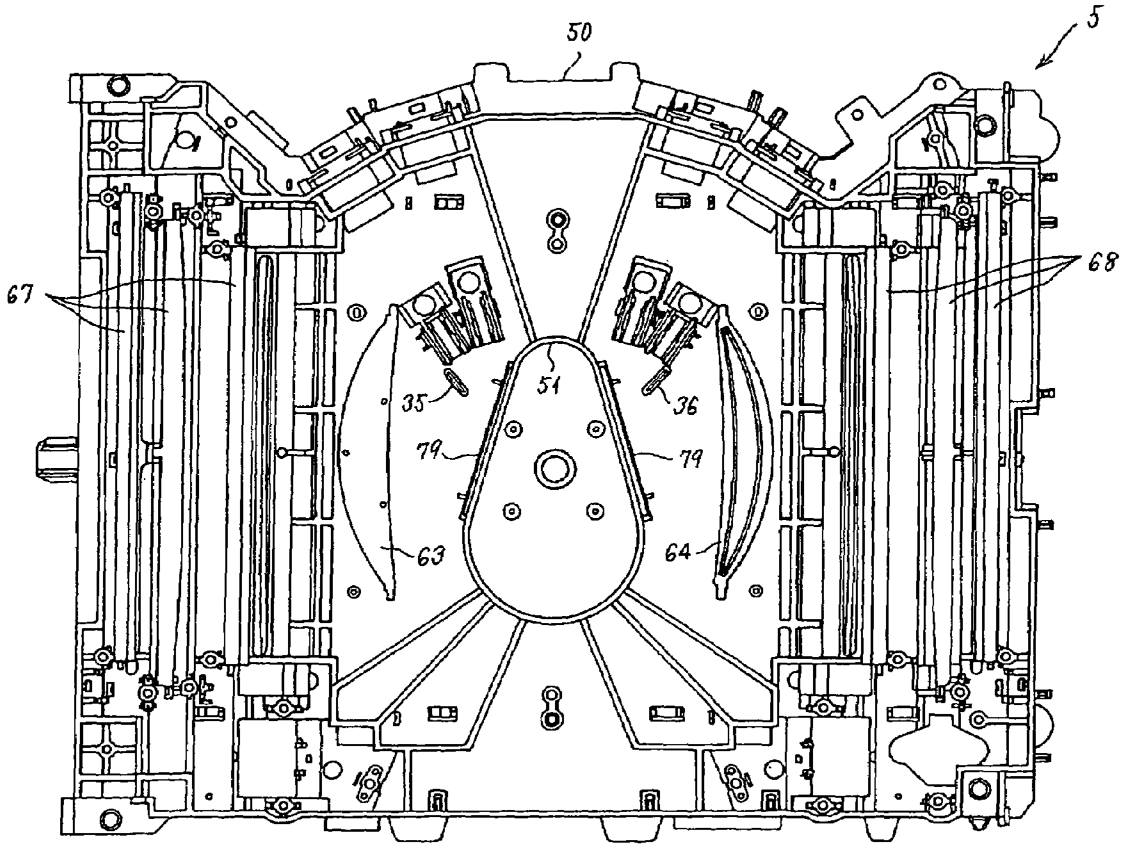
FIG. 6 is a bottom view of the optical scanner shown in FIG. 5.

For simplifying, the light shielding members 35 and 36 shown in FIG. 1 are enlarged and magnified to some extent than the light shielding members 35 and 36 shown in FIG. 6. Even in FIG. 2 and FIG. 3, since the light shielding members 35 and 36 are disposed on a rear surface side of the optical housing 50, the light shielding members 35 and 36 are not visible from a front surface (top surface) side (refer to a vertical cross-sectional view in FIG. 7 and a bottom view in FIG. 6 that denote a second modification).

By disposing the light shielding members 35 and 36 in this manner, the wind noise caused by the rotations of the rotating deflector 62 is generated only inside the accommodating chamber 51 and since the wind noise is shielded by the outer wall of the accommodating chamber 51, the wind noise due to the light shielding members 35 and 36 is not increased. In other words, since there is no increase in the wind noise caused by the rotations of the rotating deflector 62, it is possible to further reduce the noise as compared to the noise in the conventional technology.

Each of the light shielding members 35 and 36 is disposed at a position substantially symmetrical with respect to the rotating deflector 62 on a side of the light source units 52, 53, 54, and 55, corresponding to the center of the optical axis of the scanning optical system. Therefore, in FIG. 1, the light beams subjected to deflection scanning by the rotating deflector 62 are reflected directly from a surface of incidence of the scanning lenses 63 and 64, and generates the flare light.

From among the light beams that are reflected directly from the surface of incidence of the scanning lenses 63 and 64, light beam Fa that is reflected to a side of the light source units 52, 53, 54, and 55 on the side of the scanning lens 63 can be prevented at the light shielding member 35. However, since there is a gap between the light shielding member 35 and the rotating deflector 62 for the light beam to enter, the flare light cannot be prevented completely. In the present embodiment, by disposing the light shielding members 35 and 36, one each at positions symmetrical with respect to a vertical line that passes through a center of the rotating deflector 62, light beam Fb that enters through the gap between the light shielding members 35 and 36 and the rotating deflector 62, can be prevented at the light shielding member 36 on the opposite side, thereby preventing the flare light more assuredly. As a matter of course, by disposing the light shielding members 35 and 36 symmetrically in this manner, the similar advantages and effects can be achieved for the scanning optical systems on both sides of the rotating deflector 62.

Moreover, since the light shielding members 35 and 36 are formed integrally with the optical housing 50, there is no increase in the number of components and it is possible to provide a low cost optical scanner.

At the same time, the inner wall 51*a* and the outer wall 51*b* of the accommodating chamber 51 accommodating the rotating deflector 62, that is formed integrally in the optical housing 50 serves as the light shielding member shielding the flare light on the side where there is no light source unit, with respect the center of the optical axis of the scanning optical system. In other words, from among the flare light that is reflected directly from the surface of incidence of the scanning lenses 63 and 64, flare light Fc and Fd that enters into the side where the light source unit is not disposed, is prevented by the inner wall 51*a* and the outer wall 51*b* of the accommodating chamber 51 of the rotating deflector 62. As a result, it is possible to prevent assuredly the flare light all over the area of the effective scanning range of the scanning optical system, by a low cost structure.

Furthermore, since the optical housing 50 in the optical scanner 5 is made of a resin, it is possible to reduce further the cost of the components and the dye structure is not complicated as shown in FIG. 2. In other words, a portion corresponding to the light shielding wall of the light shielding members 35 and 36 is not undercut or forced cut, thereby contributing to the cost reduction.

Moreover, since carbon black is mixed as pigments that absorb the flare light caused due to the scanning optical system for the optical housing 50 together with the light shielding members 35 and 36 and the accommodating chamber 51, and advantage and effect that the assured reduction and absorption of the flare light can be achieved by the simplest and low cost structure.

Since the light shielding members 35 and 36 are disposed between the light beams L2 and L3 that are the light beams incident from the light source units 52 and 55 respectively to the rotating deflector 62 and a light beam that is subjected to deflection scanning from the rotating deflector 62 to the scanning optical system, as well as the light shielding members 35 and 36 are disposed on the outer side of the accommodating chamber 51, in an opposite sides scanning optical scanner the shape of a circumference of the accommodating chamber becomes an egg shape shown in FIG. 1 or a rhombus shape (shape of a coffin) shown in FIG. 4 which is one of the characteristics. In this case, while forming the accommodating chamber 51 having the egg shape, the dye structure used for forming the resin becomes complicated. Therefore, the rhombus shape that is advantageous from the dye structure point of view may be used.

In addition, a surface of the inner wall 51*a* of the accommodating chamber 51 that accommodates the rotating deflector 62 is formed as a round shape without any angles all over the circumference (or a circular arc) having roundness in a range of about R2 to R5. Accordingly, an effect of shielding the wind noise caused by the rotation of the rotating deflector 62 can be improved further.

A first modification of the embodiment shown in FIG. 1 to FIG. 3 is shown in FIG. 4.

The first modification, as compared with the optical scanner 5 of the embodiment differs at a point that a sound-proof glass 79 is provided as a light transmission sound insulating member that allows the light transmission but insulates sound in each of the apertures 51*c* of the accommodating chamber 51 in the effective scanning range of the light beam that is subjected to deflection scanning by the rotating deflector 62. The rest of the structure is similar to the structure of the optical scanner 5 and the image forming apparatus.

According to the first modification, in addition to the advantages and effects of the first modification, by sticking a sound-proof glass 79 such as a flat glass that is a light transmission sound insulating member in the effective scanning range of the light beams that are deflected by reflection, to the accommodating chamber 51 of the rotating deflector 62, the sound insulating effect can be improved further.

Figure 5:
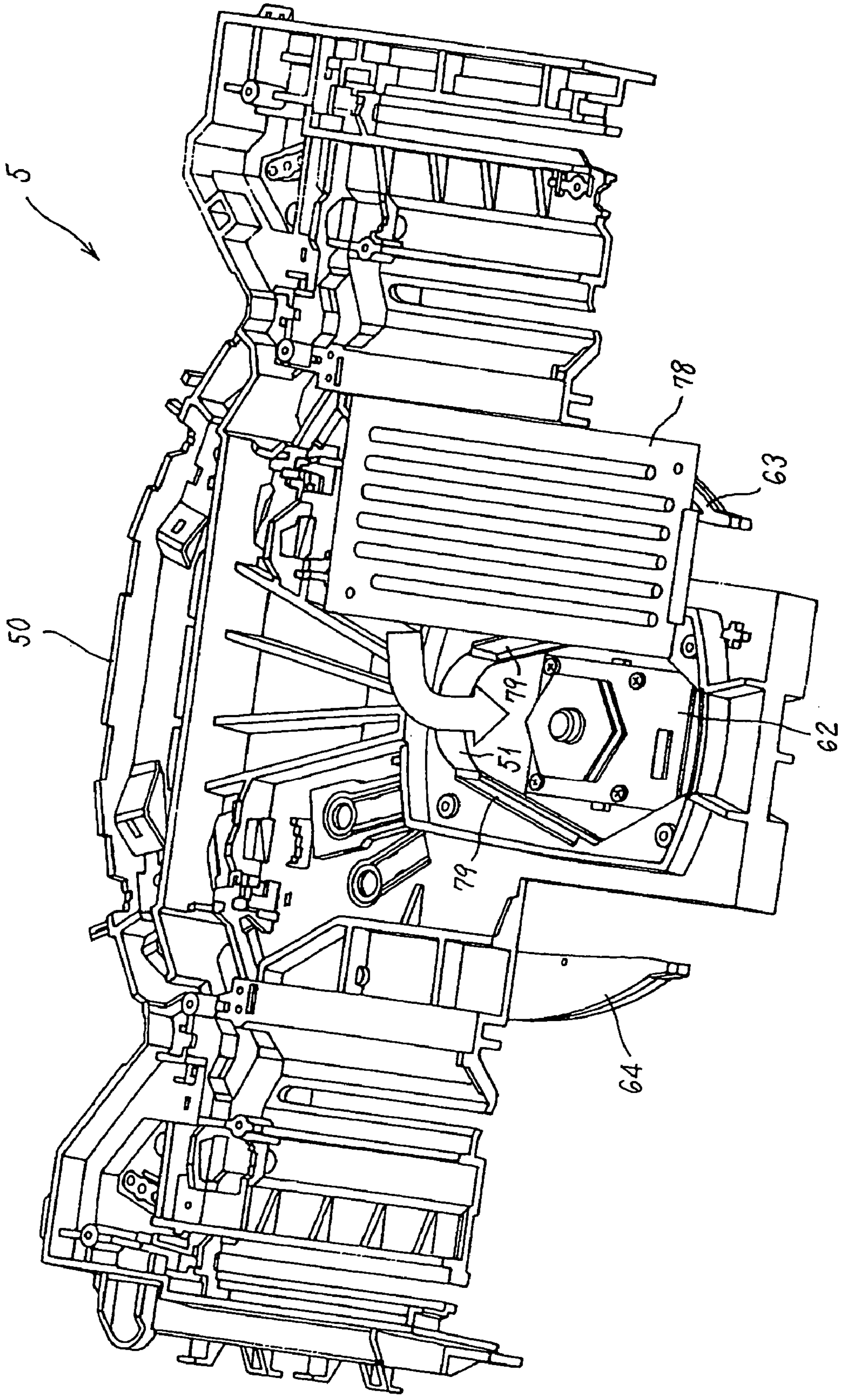
FIG. 5 is a perspective view of an upper side of an optical scanner according to a second modification of the first embodiment.
Figure 7:
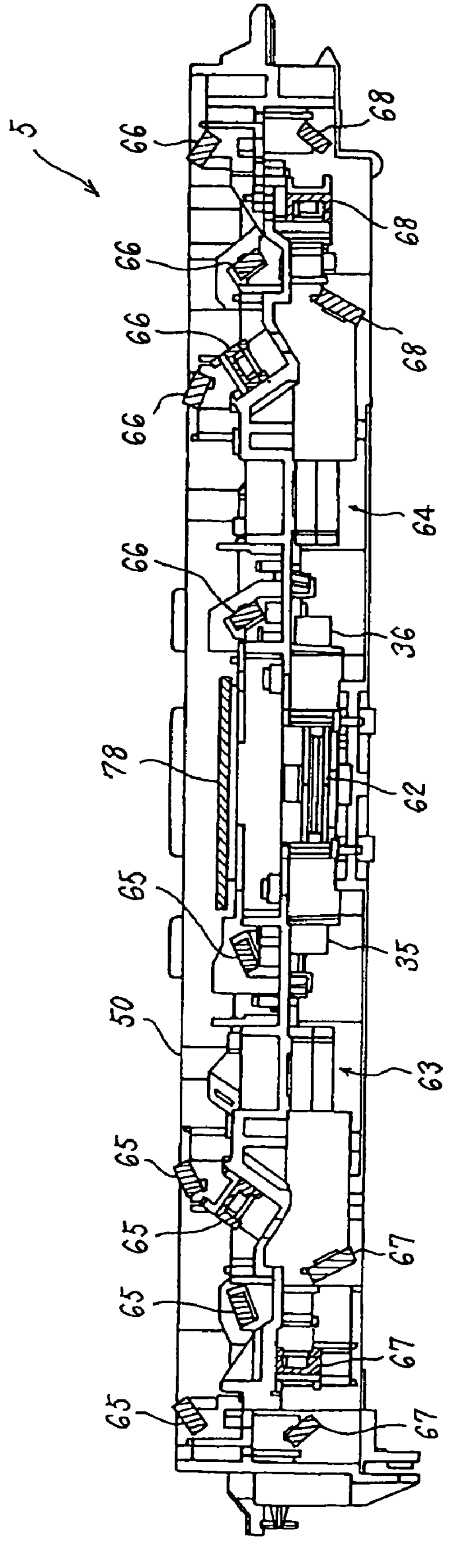
FIG. 7 is a vertical cross-section of the optical scanner shown in FIG. 5.

A second modification of the first modification shown in FIG. 4 is shown in FIG. 5 to FIG. 7.

The second modification, as compared with the first modification, differs only at a point that a cover 78 is provided as a lid member to close tightly at least the accommodating chamber 51 of the optical housing 50 and the rest of the structure is similar to the structure of the optical scanner and the image forming apparatus of the first modification. The cover 78 is fixed to the optical housing 50 by a fixing means such as a screw.

According to the second modification, in addition to the advantages and effects of the first modification, the accommodating chamber 51 of the rotating deflector 62 can be closed tightly by the cover 78.

In addition, if the cover 78 is formed of a metal, such as a metallic member such as a steel plate or an aluminum plate, it is possible to suppress the rise in temperature inside the accommodating chamber 51 caused due to the rotating deflector 62.

Figure 10:
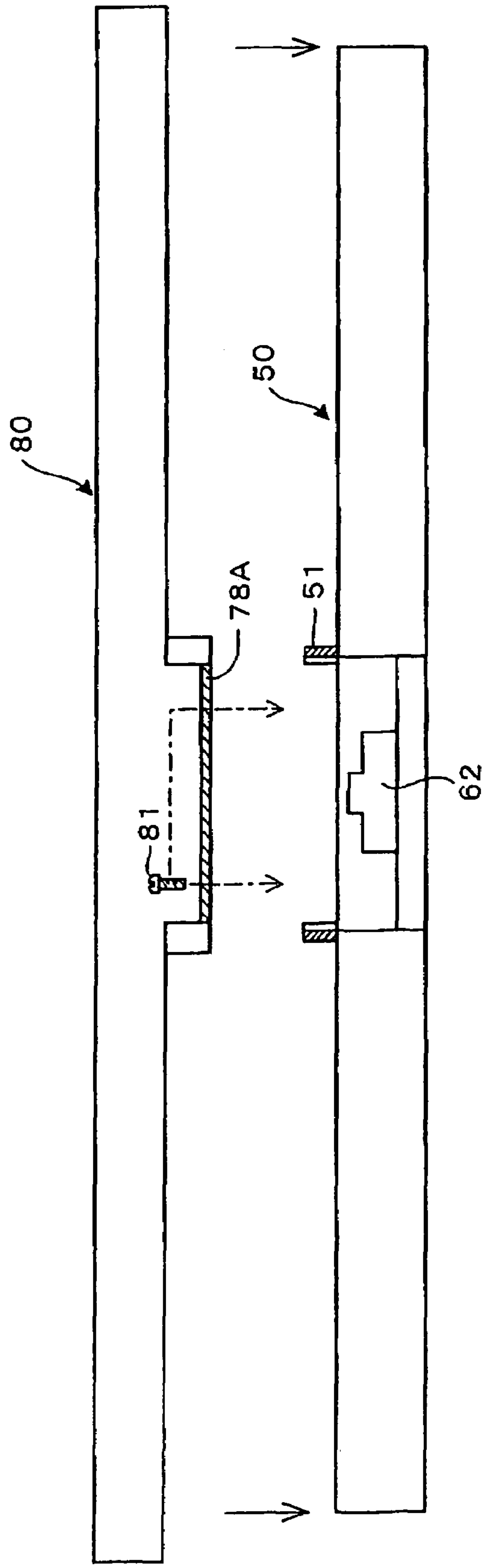
FIG. 10 is a simplified front view of a part of a cross section for describing an installation of a metallic cover and a housing cover of an optical scanner according to a third modification of the first embodiment.

A third modification of the second modification shown in FIG. 5 to FIG. 7 is shown in FIG. 10.

The third modification, as compared with the second modification, differs mainly at a point that a housing cover 80 that is detachable and covers the entire optical housing 50 is provided to the optical housing 50 and that apart from the housing cover 80, a cover 78A made of a metal is provided separately as a lid member that closes tightly the accommodating chamber 51.

The housing cover 80, similarly as the optical housing 50, is formed integrally of a resin material such as a polycarbonate resin (PC). The cover 78A is formed of a metallic member in the form of a thin plate such as a steel plate and an aluminum plate. The cover 78A is fixed to the optical housing 50 by a fixing means such as a screw 81 through the housing cover 80.

According to the third modification, in addition to the advantages and effects of the first modification, the accommodating chamber 51 of the rotating deflector can be closed tightly. Therefore, it is possible to improve the sound insulating effect and the heat radiation effect more effectively.

As it is described so far, according to the first modification to the third modification, by letting the image forming apparatus to include the optical scanner 5, it possible to achieve the image formation with a simple structure and at a low cost as well as to eliminate assuredly the deterioration of the image quality such as an occurrence of the image with lines and the ghost image due to the flare light.

Specific embodiments and modification of the embodiments of the present invention are described above. However, a technological scope disclosed by the present invention is not restricted to the embodiments and the modifications described above. Structures may be formed by combining appropriately the embodiments and the modified embodiments and within the scope of the present invention, it is evident for a person having an ordinary skill in the art that various embodiments and modified embodiments may be formed according to the requirement and the applications.

According to the embodiments, flare light can be prevented and a similar effect can be achieved while disposing a light shielding unit further away from the deflecting unit. Therefore, it is possible to reduce a wind noise caused due to the rotation of the deflecting unit (such as rotating deflector) and to prevent an increase in the wind noise caused by the light shielding unit.

Moreover, flare light can be prevented and since the light shielding unit is disposed outside an accommodating chamber in which the deflecting unit is disposed and accommodated, the wind noise that is caused due to the rotation of the deflecting unit (such as rotating deflector) is shielded by an outer wall of the accommodating chamber. Therefore there is no increase in the wind noise caused by the light shielding unit and the noise can be further reduced as compared to the conventional technology.

Furthermore, one light shielding unit each is disposed at substantially symmetrical positions with respect to a center of the deflecting unit such that the light shielding unit is sandwiched between each of scanning lenses provided in an optical system unit. Therefore, it is possible to prevent the flare light entering in from a gap between the light shielding unit and the deflecting unit, at the light shielding unit of an opposite side, thereby enabling to prevent the flare light assuredly. In addition, by disposing the light shielding units substantially symmetrically, a similar effect can be achieved for the scanning optical system on any of left and right sides with the deflecting unit at the center.

Moreover, the light shielding unit includes a light shielding member and the light shielding member is formed integrally with the accommodating chamber and a housing unit. Therefore, there is not increase in the number of components and the optical scanner can be provided at a low cost.

Furthermore, an inner wall and the outer wall of the accommodating chamber also serves as the light shielding member that prevents light reflected and scattered by the optical system unit on a side where a plurality of light source units are not there, with respect to a center of an optical axis of each optical system unit. Therefore, it is possible to prevent assuredly the flare light over an entire area of an effective scanning range of each optical system unit (such as scanning optical system) with a low cost structure. Further it is possible to suppress the number of components and to let the housing unit to have a simple structure.

Moreover, a light transmission sound insulating member that allows light transmission but insulates sound is provided in the accommodating chamber of the effective scanning range of the light beams subjected to deflection scanning by the deflecting unit. Therefore, it is possible to further reduce the noise.

Furthermore, the housing unit is formed by a resin. Therefore, the cost of the components can be reduced.

Moreover, the resin that forms the housing unit includes pigments that absorb the light reflected and scattered by the optical system unit. Therefore, the reflected and scattered light (flare light) can be reduced assuredly by the simplest and low cost structure.

Furthermore, a round shape without any angle is formed over the circumference of an inner surface wall of the accommodating chamber. Therefore, the wind noise caused by the rotation of the deflecting unit (such as rotating deflector) can be reduced further.

Moreover, at least the accommodating chamber of the housing member is closed tightly by a lid member. Therefore the wind noise caused by the rotation of the deflecting unit (such as rotating deflector) can be reduced further.

Furthermore, the lid member is formed of a metal. Therefore, by a heat radiation of the metal, a rise in temperature due to the rotation of the deflecting unit (such as rotating deflector) can be suppressed.

Moreover, by letting an image forming apparatus to include a plurality of image carriers provided with surface to be scanned and an optical scanner described in any one of first aspect to twelfth aspect, the image forming apparatus having a simple structure and low cost can be achieved. Moreover, deterioration of an image quality such as an occurrence of image with lines and ghost image due to the reflected and scattered light (flare light) can be eliminated assuredly.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanner comprising:

a first light source unit group that emits light beams from a plurality of light sources, the light beams from the first light source unit group being incident into a first scanning lens;

a second light source unit group that emits light beams from a plurality of light sources, the light beams from the second light source unit group being incident into a second scanning lens;

a rotatable deflecting unit that commonly deflects the light beams emitted by the first and second light source unit groups wherein the light beams are all directly incident into the deflecting unit; and a first scanning lens and a second scanning lens, each of which guides a corresponding one of deflected light beams to a corresponding surface to be scanned, the first and second scanning lenses being disposed symmetrically around a center of rotation of the deflecting unit and opposed to each other with the deflecting unit provided therebetween;

a housing unit that houses the first and second light source unit groups, the deflecting unit, and the plurality of scanning lenses; and a light shielding unit disposed in the housing unit so as to prevent the reflection and scattering of the light beams deflected from and by the first and second scanning lenses, the light shielding unit being disposed between light beams that fall on the deflecting unit and light beams that are deflected from the deflecting unit so as to not block any light beam directly incident to the deflecting unit and so as to not block any light beams deflected by the deflecting unit at an acute angle, wherein the light shielding unit is disposed between the first and second scanning lenses and the deflector such that the light shielding unit can prevent the reflection and scattering of the light beam that is emitted from the first light source unit group and reflected from the deflecting unit and the surface of incidence of the first scanning lens from being incident into the second scanning lens, and the light shielding unit can prevent the reflection and scattering of the light beam that is emitted from the second light source unit group and reflected from the deflecting unit and the surface of incidence of the second scanning lens from being incident into the first scanning lens, wherein the light shielding unit has a sufficient height that can shield flare lights made by the light beams deflected by both an upper and lower portion of the deflecting unit, and wherein the light shielding unit is disposed outside of an angle formed by the plurality of light sources of the first light source unit group, and outside of an angle formed by the plurality of light sources of the second light source unit group, so as to reduce noise.

2. The optical scanner according to claim 1, further comprising an accommodating chamber that houses the deflecting unit, the accommodating chamber being disposed inside the housing unit, and the light shielding unit being disposed outside the accommodating chamber.

3. The optical scanner according to claim 2, wherein the light shielding unit includes a plurality of second light shielding members that are formed integrally with the housing unit together with the accommodating chamber.

4. The optical scanner according to claim 3, wherein an inner wall and an outer wall of the accommodating chamber also serves as the light shielding member that prevents light reflected and scattered by the first and second scanning lenses on a side where the first and second light source unit groups are not there, with respect to a center of an optical axis of each of the first and second scanning lenses.

5. The optical scanner according to claim 2, further comprising a light transmission sound insulating member that allows light transmission but shuts sound in an accommodating chamber that is within an effective scanning range of the deflected light beams.

6. The optical scanner according to claim 2, wherein the housing unit is formed of a resin.

7. The optical scanner according to claim 6, wherein the resin includes pigments that absorb reflected and scattered light by first and second scanning lenses.

8. The optical scanner according to claim 2, wherein substantially entire circumference of an inner wall surface of the accommodating chamber is formed in a non-planar shape without any protrusions.

9. The optical scanner according to claim 2, wherein at least the accommodating chamber in the housing unit is closed tightly with a lid member.

10. The optical scanner according to claim 9, wherein the lid member is made of a metal.

11. The optical scanner according to claim 2, wherein the accommodating chamber is substantially in an egg-shape.

12. The optical scanner according to claim 1, wherein the light shielding unit includes a plurality of first light shielding members, and a first light shielding member is disposed one each at positions that are substantially symmetrical with respect to the center such that the first light shielding unit is sandwiched between the plurality of scanning lenses.

13. An image forming apparatus comprising:

the optical scanner according to claim 1; and a plurality of image carriers that includes a surface subjected to scanning.

* * * * *